United States Patent [19]

Prüss et al.

[11] Patent Number: 5,101,942
[45] Date of Patent: Apr. 7, 1992

[54] HYDRAULIC CONTROL SYSTEMS FOR TRANSMISSIONS

[75] Inventors: Ludwig Prüss, Braunschweig; Günter Uhlig, Gifhorn; Fritz Blumenstein, Wolfburg, all of Fed. Rep. of Germany

[73] Assignee: Volkswagen AG, Fed. Rep. of Germany

[21] Appl. No.: 697,878

[22] Filed: May 9, 1991

[30] Foreign Application Priority Data

May 9, 1990 [DE] Fed. Rep. of Germany ....... 4014782

[51] Int. Cl.[5] ................ B60K 41/22; F16D 25/11
[52] U.S. Cl. ................... 192/3.58; 74/335; 192/87.18
[58] Field of Search ........... 192/3.51, 3.58, 87.13, 192/87.18, 87.11, 3.57; 74/335

[56] References Cited

U.S. PATENT DOCUMENTS

| | | | |
|---|---|---|---|
| 4,452,101 | 6/1984 | Fujioka | 192/87.18 X |
| 4,560,045 | 12/1985 | Walsh | 192/3.58 |
| 4,637,269 | 1/1987 | Hasegawa et al. | 74/335 |
| 4,848,530 | 7/1989 | Chess | 192/3.58 |

*Primary Examiner*—Rodney H. Bonck
*Attorney, Agent, or Firm*—Brumbaugh, Graves, Donohue & Raymond

[57] ABSTRACT

In the embodiments described in the specification, a hydraulic control system for supplying pressure to a plurality of servo motors associated with shift elements of the several speeds of a transmission includes a slide valve having three positions arranged so that, in each position, two of the servo motors at a time are connectable alternatively with two separate pressure medium delivery lines. Valves are provided in the pressure medium delivery lines for alternate connection of the lines to a central pressure medium supply line.

7 Claims, 2 Drawing Sheets

| PILOT VALVES / SLIDE VALVE | 13 OPEN 14 CLOSED | 13 CLOSED 14 OPEN |
|---|---|---|
| LEFTHAND END POSITION | SECOND SPEED SERVOMOTOR 25 | THIRD SPEED SERVOMOTOR 24 |
| CENTRAL POSITION | BRAKE SERVOMOTOR 20 | FIFTH SPEED SERVOMOTOR 22 |
| RIGHTHAND END POSITION | FOURTH SPEED SERVOMOTOR 23 | FIRST SPEED SERVOMOTOR 26 |

FIG. 2

HYDRAULIC CONTROL SYSTEMS FOR TRANSMISSIONS

BACKGROUND OF THE INVENTION

This invention relates to hydraulic control systems for supplying pressure to servo motors associated with the gear change mechanism for a multi-speed transmission.

Synchronizing arrangements for gear change mechanisms in vehicle transmissions are known in which the synchronization of the transmission elements to be coupled together during a shifting operation is accomplished by a preferably electronic engine speed control after disengagement of the old speed rather than by the traditional mechanical synchronizer integrated with the transmission. With such electronic control arrangements, special synchronizing elements are no longer required. In such electronic control arrangements, however, it is necessary that the transmission elements to be coupled together are actuated as rapidly and smoothly as possible when the synchronizing point is reached, and suitable servo motors are provided for this purpose.

SUMMARY OF THE INVENTION

Accordingly, it is an object of the present invention to provide a new and improved control arrangement for activating servo motors in an electronically controlled transmission.

Another object of the invention is to provide a control arrangement of this type which has a very compact construction and provides a prompt application of pressure to the servo motors associated with the transmission elements to be shifted.

These and other objects of the invention are attained by providing a hydraulic control arrangement having a plurality of servo motors and a three-position slide valve arranged so that, in each position of the slide valve, two of the servo motors are connected to separate pressure delivery lines, each of which is connectable by a pilot valve to a main pressure supply line. With this arrangement, a durable and reliable control system can be provided at low cost.

BRIEF DESCRIPTION OF THE DRAWINGS

Further objects and advantages of the invention will be apparent from a reading of the following description in conjunction with the accompanying drawings, in which:

FIG. 2 is a chart showing the operational settings of a slide valve and of two pilot valves in order to actuate servo motors to provide several speeds.

DESCRIPTION OF PREFERRED EMBODIMENTS

Figure 1:
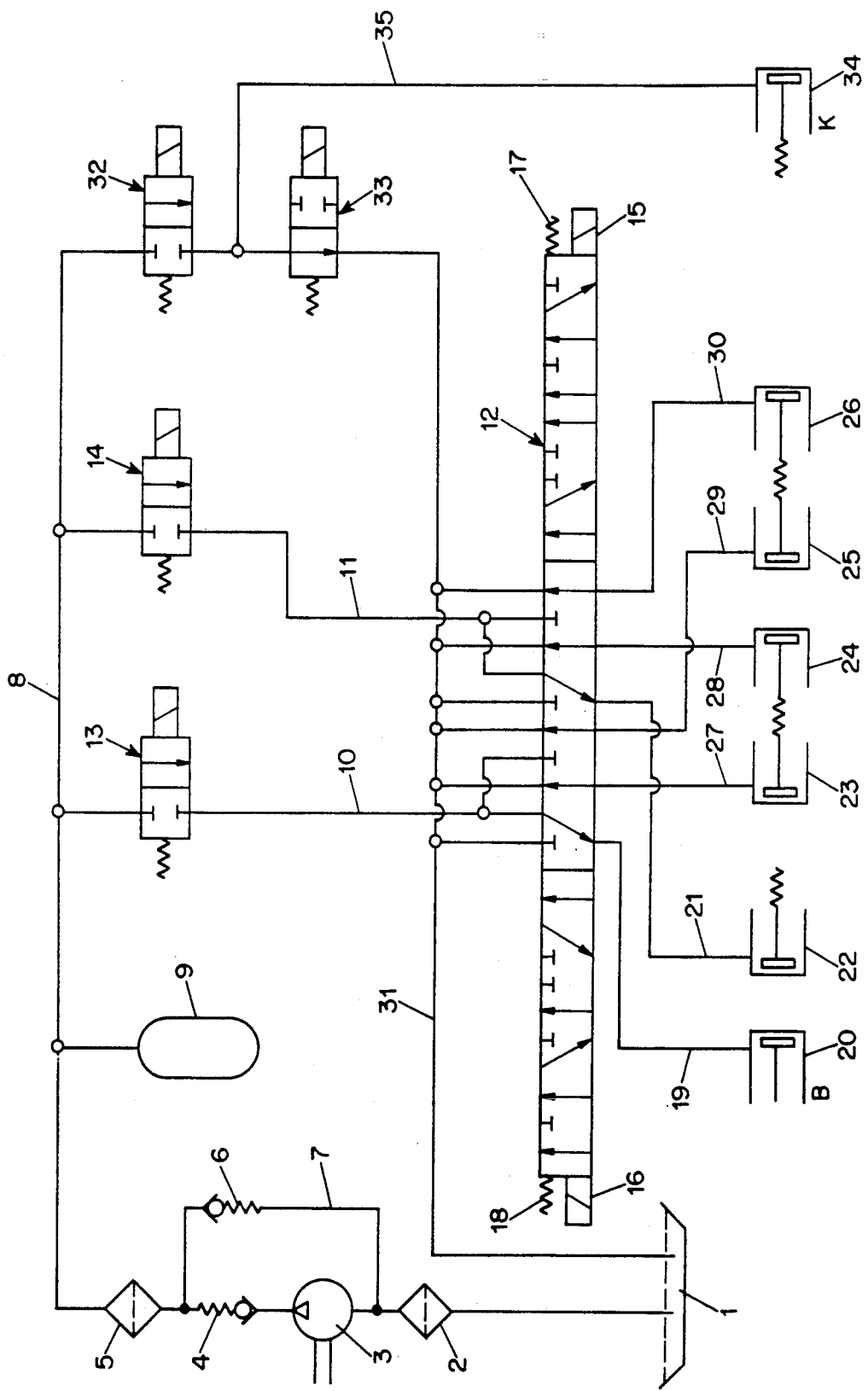
FIG. 1 is a schematic hydraulic circuit diagram showing a representative embodiment of the invention and illustrating an arrangement for actuation of two of the servo motors.

In the schematic illustration of a typical embodiment of the invention shown in FIG. 1, a hydraulic circuit diagram of the control arrangement includes a pressure medium supply tank 1, a filter 2, a pump 3, a check valve 4 and another filter 5. A pressure-limiting valve 6, arranged in a return line 7, opens when a selected pressure in a central pressure medium supply line 8 is exceeded, returning some of the pressure medium back to the intake side of the pump 3. A pressure medium reservoir 9, for example, a diaphragm reservoir, is connected to the supply line 8.

From the supply line 8, two pressure medium delivery lines 10 and 11 lead to a slide valve arrangement 12. Two valves 13 and 14 are disposed in the pressure medium delivery lines 10 and 11, respectively. In the illustrated arrangement, the valves 13 and 14 are dual-port pilot valves. These pilot valves 13 and 14, which are electromagnetically actuable against the force of a spring, open the corresponding pressure medium delivery line 10 or 11 to the central pressure medium supply line 8 when actuated, or close off that connection when de-energized. In the position shown in the drawing, both of the pilot valves 13 and 14 are in their deenergized position, in which they prevent communication between the delivery lines 10 and 11 and the central pressure medium supply line 8. When current is applied to one of the pilot valves 13 and 14, the valve will shift into a position where the central pressure medium supply line 8 is connected to the corresponding pressure medium delivery lines 10 or 11.

The pressure medium delivery lines 10 and 11, as previously mentioned, lead to the slide valve 12, which in the illustrated embodiment is adjustable from both ends by two electromagnetic servo devices 15 and 16 which move the valve in opposite directions from a central position against the action of either of two springs 17 and 18. In the central position of the slide valve 12 shown in the drawing, neither of the electromagnetic servo means 15 and 16 is energized, so that the valve position is determined solely by the force of the springs 17 and 18. In this central position of the slide valve 12, the pressure medium delivery line 10, which branches ahead of the slide valve 12, communicates by way of one branch with a pressure line 19 leading to a servo motor 20. This servo motor 20, in the illustrated embodiment, actuates a brake B which acts upon the drive motor in such a way that, if the drive train is disconnected, the transmission elements to be engaged, which are not shown in the drawing, are synchronized before engagement.

The second pressure medium delivery line 11 is connected by the slide valve 12 through one of its branches to a pressure line 21 connected to a servo motor 22 for actuating the fifth speed of the transmission. As may also be seen in the drawing, there are four further pressure lines 27-30 leading from the slide valve 12 to four servo motors 23, 24, 25 and 26, respectively. In the valve position shown in the drawing, all of these lines are connected to an outlet line 31 to return the pressure medium to the supply tank 1, which is at atmospheric pressure. Consequently, the servo motors to which those lines are connected are inactive in this valve position.

When the slide valve 12 is moved to either end position by impressing current on one of the electromagnetic servo devices 15 and 16, two other servo motors are connected to the pressure medium delivery lines 10 and 11. The table shown in FIG. 2 specifies which of the other servo motors is subject to pressure for each of the different settings of the slide valve 12 and the pilot valves 13 and 14. This table shows that, in the righthand end position of the slide valve 12, the servo motors 23 and 26 for actuating the fourth and first speeds are connected to the pressure medium delivery lines 10 and 11, respectively. Consequently, upon opening of the pilot valve 13, the servo motor 23 will receive pressure to actuate the fourth speed whereas, upon opening of the pilot valve 14, the servo motor 26 for the first speed is activated.

In the lefthand end position of the slide valve 12, the servo motors 25 and 24 for the second and third speeds are connectable to the pressure medium delivery lines 19 and 15, respectively. Accordingly, upon opening of the pilot valve 13, the servo motor 25 for the second speed is supplied with pressure medium and, upon opening of the pilot valve 14, the servo motor 24 for the third speed is actuated. In each of these positions of the slide valve 12, the servo motors which are not connected to the pressure medium delivery lines are joined to the outlet line 31 and consequently are inactive.

Moreover, the embodiment illustrated in FIG. 1 includes a valve device composed of two further pilot valves 32 and 33 to actuate an additional servo motor 34. This servo motor may be provided, for example, to operate a start and shift clutch K by pressure from the central medium supply line 8 received by way of a pressure medium delivery line 35. To disengage the clutch K, the pilot valve 32 is moved into the open position and the pilot valve 33 into the closed position, so that the servo motor 34 opens the clutch against the force of a spring tending to engage the clutch. The pilot valves 32 and 33 are also electromagnetically actuated with circuits arranged so that, in the absence of current, the valve 32 will be in the closed position and the valve 33 will be in the open position. This ensures that, if the pilot valve 32 happens to be defective, the clutch K will not be opened by actuation of the servo motor 34, which would prevent continued operation of the vehicle. Preferably, the pilot valve 32 is triggered by electrical impulses arranged so that a certain pulse-pause ratio will permit a very fine matching of differential rotational speed at the clutch.

In the control device according to the invention, the use of dual-port valves for the pilot valves 13 and 14 and 32 and 33 is especially advantageous because this permits a very rapid pressure response. This is especially important to provide the shortest possible switching times. The arrangement of the connections provided by the slide valve 12 is so chosen that a speed change with a small differential, in this case, for example, from the fifth speed to the fourth, will require valve action times which are as short as possible.

The storage capacity of the pressure medium reservoir 9 is selected so that, in the event of failure of the pump 3, a clutch actuation and a speed change will be possible using the pressure medium reservoir alone. In this way, moreover, the power required for the pump 3 can be kept very low, thus reducing its power loss, especially at high rotational speed of the drive system.

As is also shown by the typical embodiment described above, the invention, in addition to providing a compact and rapidly operating transmission control system, also advantageously addresses the problems of economy and safety.

Although the invention has been described herein with reference to specific embodiments, many modifications and variations therein will readily occur to those skilled in the art. Accordingly, all such variations and modifications are included within the intended scope of the invention.

We claim:

1. A hydraulic control system for supplying pressure to servo motors associated with shift elements in a multispeed transmission comprising a central pressure medium supply line, a plurality of servo motors associated with corresponding shift elements, a slide valve having three positions and arranged to connect two of the servo motors to corresponding pressure medium delivery lines in each position, and valve means for connecting each of the pressure medium delivery lines alternatively to the central pressure medium supply line.

2. A hydraulic control system according to claim 1 including an outlet line connected to a pressure medium supply tank and wherein the slide valve in each position connects each of the servo motors which are not then connected to the pressure medium delivery lines to the outlet line leading to the pressure medium supply tank.

3. A hydraulic control system according to claim 1 including two servo means for displacing the slide valve into one or the other of two end positions and including two spring arrangements opposing the action of the servo means so that, when neither servo means is actuated, the spring arrangements hold the slide valve in a central position.

4. A hydraulic control system according to claim 3 wherein the servo means comprise electromagnetic drive elements.

5. A hydraulic control system according to claim 1 wherein the valve means comprises two electromagnetically actuable shift valves which, in a first position, establish communication between the central pressure medium supply line and a corresponding pressure medium delivery line and, in a second position, interrupt that communication.

6. A hydraulic control system according to claim 1 including an outlet line connected to a pressure medium supply tank and additional valve means for alternatively connecting a further pressure medium line leading to a servo motor for a vehicle clutch to the pressure medium supply line or to the outlet line.

7. A hydraulic control system according to claim 6 wherein the additional valve means consists of two electromagnetically actuable shift valves, one of the shift valves establishing communication between the further pressure medium line and the pressure medium supply line in a first position and interrupting that communication in a second position and the other shift valve establishing communication between the pressure medium line and the outlet line in a first position and interrupting that communication in a second position and wherein the two shift valves are actuable so that in each instance one assumes its first position and the other its second position and vice versa.

* * * * *